(12) United States Patent
Rubin et al.

(10) Patent No.: US 7,657,228 B2
(45) Date of Patent: Feb. 2, 2010

(54) DEVICE, SYSTEM AND METHOD OF NOISE IDENTIFICATION AND CANCELLATION

(75) Inventors: Amir Rubin, Ramat Gan (IL); Vladimir Kravtsov, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 11/442,384

(22) Filed: May 30, 2006

(65) Prior Publication Data

US 2007/0281620 A1 Dec. 6, 2007

(51) Int. Cl.
*H04B 1/00* (2006.01)
*H04B 15/00* (2006.01)

(52) U.S. Cl. .................. 455/63.1; 455/67.13; 455/570; 455/575.7; 455/114.2; 455/562.1; 455/296; 370/209; 370/342; 375/130; 375/219; 375/148; 375/144

(58) Field of Classification Search ............... 455/562.1, 455/552.1, 63.1, 67.13, 570, 575.7, 114.2, 455/296, 63.4; 375/342, 130, 219; 370/209, 370/342

See application file for complete search history.

(56) References Cited

U.S. PATENT DOCUMENTS

| | | | | |
|---|---|---|---|---|
| 5,224,122 A | * | 6/1993 | Bruckert | 375/148 |
| 5,235,612 A | * | 8/1993 | Stilwell et al. | 375/144 |
| 5,325,394 A | * | 6/1994 | Bruckert | 375/148 |
| 6,112,057 A | * | 8/2000 | Weiss et al. | 455/63.4 |
| 6,232,921 B1 | * | 5/2001 | Aiken et al. | 342/383 |
| 6,236,862 B1 | * | 5/2001 | Erten et al. | 455/501 |
| 6,285,718 B1 | * | 9/2001 | Reuven | 375/257 |
| 6,320,919 B1 | * | 11/2001 | Khayrallah et al. | 375/347 |
| 6,836,673 B1 | * | 12/2004 | Trott | 455/562.1 |
| 6,934,345 B2 | * | 8/2005 | Chu et al. | 375/346 |
| 6,959,056 B2 | * | 10/2005 | Yeap et al. | 375/346 |
| 6,968,171 B2 | * | 11/2005 | Vanderhelm et al. | 455/296 |
| 7,020,212 B1 | * | 3/2006 | Strait | 375/260 |
| 7,415,061 B2 | * | 8/2008 | Currivan et al. | 375/144 |
| 7,437,167 B2 | * | 10/2008 | Kartchner | 455/456.1 |
| 7,450,671 B2 | * | 11/2008 | Pajukoski et al. | 375/347 |
| 7,471,930 B2 | * | 12/2008 | Okuyama et al. | 455/78 |
| 2002/0093908 A1 | * | 7/2002 | Yeap | 370/201 |
| 2006/0227887 A1 | * | 10/2006 | Li et al. | 375/260 |
| 2008/0045161 A1 | * | 2/2008 | Lee et al. | 455/73 |
| 2008/0176519 A1 | * | 7/2008 | Kwak et al. | 455/67.13 |

* cited by examiner

*Primary Examiner*—Marceau Milord
(74) *Attorney, Agent, or Firm*—Pearl Cohen Zedek Latzer, LLP

(57) ABSTRACT

Some embodiments of the invention provide devices, systems and methods of noise identification and cancellation. For example, an apparatus in accordance with an embodiment of the invention includes: a characterizer to estimate a non-linear mutual relation between: a characteristic of an incoming interference signal, and an estimated portion of noise level in an incoming signal-of-interest caused by the incoming interference signal; and a noise canceller to reduce an effect of the interference signal on the signal-of-interest by applying a noise reduction algorithm based on said non-linear mutual relation.

21 Claims, 2 Drawing Sheets

DEVICE, SYSTEM AND METHOD OF NOISE IDENTIFICATION AND CANCELLATION

BACKGROUND OF THE INVENTION

In the field of wireless communication, an Access Point (AP) may communicate with a first wireless communication station in accordance with a first wireless communication standard or protocol. Signals transmitted by a second wireless communication station, for example, operating in accordance with a second wireless communication protocol, may interfere with the signals transmitted by the AP to the first station. Other types of interference signals may interfere with the signals transmitted by the AP to the first station.

The reception path of the first station may attempt to identify interference, e.g., using a component within the reception path or based on a sample produced by the reception path, in order to mitigate or cancel identified interference. Unfortunately, the reception path of the first station may not properly identify the interference, for example, due to "whitening" or other effects of components of the reception chain on the interference which the reception chain attempts to identify.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
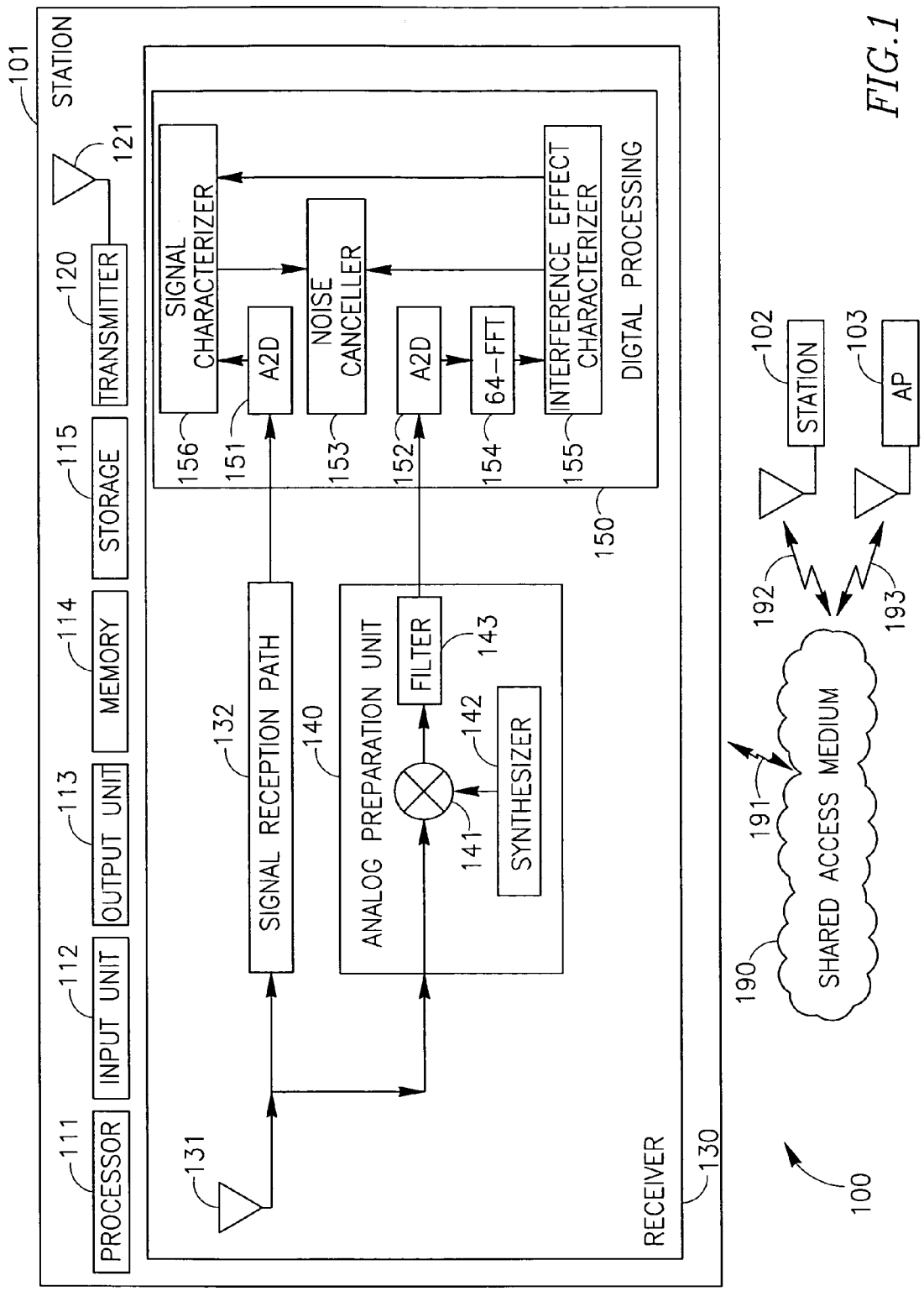
FIG. 1 is a schematic block diagram illustration of a wireless communication system utilizing noise identification and cancellation in accordance with a demonstrative embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless. LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (RTM), ZigBee (TM), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the terms "noise" and/or "interference" as used herein may include, for example, wireless or wired interference, wireless or wireless noise, a signal or signals other than a wireless communication signal intended for reception, and/or a signal or signals other than a wireless communication signal intended for processing.

FIG. 1 schematically illustrates a block diagram of a wireless communication system 100 utilizing noise identification and cancellation in accordance with an embodiment of the invention. System 100 may include one or more wireless communication stations, for example, a wireless communication station 101. System 100 may optionally include other wireless devices, for example, a wireless communication station 102 and an Access Point (AP) 103. Station 101, station 102 and AP 103 may communicate using a shared access medium 190, for example, through wireless communication links 191, 192 and 193, respectively.

In some embodiments, for example, station 101, station 102 and AP 103 may be able to communicate in accordance with a wireless communication standard or protocol, for example, IEEE 802.11 standard. In other embodiments, for example, station 101 and AP 103 may be able to communicate in accordance with a first wireless communication standard or protocol (e.g., IEEE 802.11 standard), whereas station 102 may be able to communicate with other wireless devices in accordance with a second wireless communication standard or protocol (e.g., IEEE 802.16 standard), for example, over the same frequency band(s) used by the first wireless communication standard or protocols, or over mutually related frequency band(s).

Station 101 may include, for example, a processor 111, an input unit 112, an output unit 113, a memory unit 114, a storage unit 115, a transmitter 120 and a receiver 130. Station 101 may optionally include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may, for example, process signals and/or data transmitted and/or received by station 101.

Input unit 112 may include, for example, a keyboard, a keypad, a mouse, a touch-pad, a stylus, a microphone, or other suitable pointing device or input device. Output unit 113 may include, for example, a Cathode Ray Tube (CRT) monitor or display unit, a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units. Memory unit 114 and/or storage unit 115 may, for example, store data transmitted and/or received by station 101.

Transmitter 120 may include, for example, a wireless Radio Frequency (RF) transmitter able to transmit wireless RF signals, e.g., through an antenna 121. Receiver 130 may include, for example, a wireless RF receiver able to receive wireless RF signals, e.g., through an antenna 131. In some embodiments, for example, transmitter 120 and/or receiver 130 may be implemented using a transceiver or a transmitter-receiver, or one or more units able to perform separate or integrated functions of transmitting and/or receiving wireless communication signals, blocks, frames, transmission streams, packets, messages and/or data.

Antenna 121 and/or antenna 131 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data. In some embodiments, optionally, antenna 121 and antenna 131 may be implemented using a common or single antenna, e.g., a transmit/receive antenna.

Antenna 131 may receive incoming wireless communication signals. The incoming signals may include, for example, a wireless communication signal intended for reception and/or processing by station 101 ("signal-of-interest" or "expected received signal"). The incoming signals may further include, for example, other signal(s) not intended for reception and/or processing by station 101, e.g., a signal intended for reception by station 102, a signal in accordance with a wireless communication standard or protocol not supported by station 101, noise, interference, or the like.

The incoming signals may be transferred to a signal reception path 132 of receiver 130, for example, an analog reception chain. The signal reception path 132 may include, for example, a multi-stage reception chain, e.g., a Surface Acoustic Wave (SAW) filter/duplexer, a Low Noise Amplifier (LNA), a mixer, a roofing filter, one or more first Programmable Gain Amplifiers (PGAs), one or more filters or adaptive filters, or the like. The signal reception path 132 may, for example, filter and/or amplify the signal intended for reception and processing, which may be passed to a digital processing unit 150. For example, the signal intended for reception and processing may enter an Analog to Digital (A2D) converter 151, which may convert the signal from an analog format to a digital format.

In accordance with some embodiments of the invention, interference may be identified or characterized by station 101 in one or more locations other than the signal reception path 132. This may allow, for example, improved identification or characterization of the interference, e.g., eliminating "whitening" or other possible effects of components of the signal reception chain 132 on the interference which is intended for identification or characterization.

In some embodiments, for example, station 101 may include an analog preparation unit 140 (e.g., a circuit or sub-circuit) which may be separate from signal reception path 132 and may perform one or more operations of identification and/or characterization of interference. For example, analog preparation unit 140 may receive the incoming signals from antenna 131, e.g., in parallel to the signal reception path 132. Analog preparation unit 140 may include, for example, a mixer 141 able to reduce or modify the frequency of the incoming signal; a synthesizer 142 able to set or tune the reception frequency of analog preparation unit 140, e.g., to a frequency at which interference is expected, or to a frequency at which interference cancellation or interference mitigation is aimed; and a filter 143 (e.g., a low pass filter) able to filter the incoming signal, e.g., reduce the passband of the signal. In one embodiment, for example, analog preparation unit 140 may be implemented using a low-cost receiver unit which may be separate from signal reception path 132, and may perform dedicated operations of receiving, estimating and/or identifying interference signals or noise. In some embodiments, analog preparation unit 140 may prepare (e.g., may filter) the analog interference signal for characterization, e.g., by a digital processing unit 150.

In some embodiments, analog preparation unit 140 may prepare the interference signal for characterization by focusing on interference signals in pre-defined frequencies or frequency bands, licensed frequency bands, non-licensed frequency bands, frequency bands associated with or used by a certain wireless communication standard or protocol, or the like. For example, in some embodiments, signal reception path 132 may operate in accordance with a first wireless communication standard (e.g., IEEE 802.11 standard) utilizing a first frequency band, whereas analog preparation unit 140 may prepare the interference signal for characterization at a second frequency band utilized by a second wireless communication standard (e.g., IEEE 802.16 standard).

In some embodiments, once an interference signal is identified and/or prepared for characterization by analog preparation unit 140, station 101 may further identify a mutual relation between the interference signal identified or prepared by analog preparation unit 140 and the effect of the interference signal at the location in which the interference signal is to be cancelled or mitigated, e.g., at reception path 132 or in the digital processing unit 150. For example, analog preparation unit 140 may pass the prepared (e.g., filtered) interference signal to an A2D converter 152, which may convert the interference signal from an analog format to a digital format. The digital interference signal may, for example, pass through a 64-point complex Fast Fourier Transform (64-FFT) unit 154, and an interference effect characterizer module 155 may characterize the interference signal, or the effect of the interference signal on the signal intended for reception and processing, using the output of the 64-FFT unit 154. For example, the interference signal may be a signal transmitted in accordance with IEEE 802.11 standard and not intended for reception by station 101.

In some embodiments, digital processing unit 150 may further include a signal characterizer module 156, for example, able to characterize the signal intended for reception and/or processing (e.g., whereas the signal may include an effect of interference). Signal characterizer module 156 may be able to characterize a mutual relation between the interference signal as prepared (e.g. filtered) by analog preparation unit 140 and the interference effect as characterized by interference effect characterizer module 155 on the signal intended for reception as received by signal reception path 132 and converted to digital format by A2D converter 151. A noise canceller unit 153 may then mitigate, reduce or cancel noise or identified interference, for example, based on the information provided by interference effect characterizer module 155 and/or signal characterizer module 156.

For example, in some embodiments, the signal characterizer module 156 may characterize the signal intended for reception and/or processing (e.g., which may include an effect of interference). The interference effect characterizer module 155 may characterize the effect of interference. The signal characterizer module 156 may identify a relation, or a mutual relation, between the characterized signal and the characterized interference (or vice versa). The noise canceller 153 may mitigate or cancel the effect of the characterized interference on the signal intended for reception, e.g., by subtracting the characterized interference from the signal intended for reception, or by otherwise taking into account or processing the output of the interference effect characterizer module 155 and the output of the signal characterizer module 156.

In some embodiments, interference may be identified or characterized at a first location or path of station 101, e.g., a location in which an improved identification may be performed; whereas the interference may be canceled or mitigated at a second location or path of station 101, e.g., a location in which the cancellation or mitigation is required or requested. In one embodiment, pre-defined (e.g., hard-wired) mechanisms or parameters may be used for cancellation or mitigation of identified interference, e.g., based on hardware characteristics of a certain implementation of station 101. In another embodiment, adaptive or dynamically modifiable parameters may be may be used for cancellation or mitigation of identified interference, e.g., taking into account actual measurements (e.g., substantially real time measurements) of characteristics of the identified interference.

In some embodiments, incoming wireless signals may be analyzed, e.g., in parallel or substantially in parallel, using multiple paths. For example, a reception path may receive and/or characterize the signal intended for reception; whereas an interference path (e.g., connected in parallel to the reception path) may characterize the incoming interference. In some embodiments, for example, noise canceller unit 153 may apply a noise reduction algorithm that takes into account one or more characteristics of the incoming interference signals, that may be determined in the analog domain, and/or that may be determined using an analysis of a "raw" (e.g., unprocessed, non-filtered, non-amplified, non-digitally-processed, or the like) incoming wireless signal.

In some embodiments, optionally, noise canceller unit 153 may utilize one or more noise canceling algorithms, for example, adaptive algorithms suitable for the specific station 101, for one or more properties of the specific station 101, and/or for certain coexistence schemes of multiple wireless communication standards or protocols. In some embodiments, improved identification and characterization of interference signals, and/or improved cancellation of identified interference signals, may be achieved with regard to relatively stronger interference signals.

In some embodiments, noise canceller 153 may receive as input an interference signal (e.g., one or more characteristics of an interferer signal), for example, as prepared by analog preparation unit 140 and characterized by interference effect characterizer 155; and a signal intended for reception (or one or more characteristics of the signal intended for reception), optionally including non-linear products or effects of the interference signal, e.g., received from signal characterizer 156. Noise canceller 153 may apply a noise mitigating algorithm, a noise reduction algorithm or a noise canceling algorithm that takes into account, for example, one or more properties of the interference signal, and one or more properties of the sum of the signal intended for reception and the linear and non-linear products of the interference signal or linear and non linear effects of the interference signal on the signal intended for reception.

In some embodiments, for example, noise canceller 153 may include a non-linear noise canceller. For example, antenna 131 may receive incoming wireless communication signals that may correspond to a sum ("received sum") of the signal intended for reception ("signal-of-interest") and a polynomial transform of an interference signal. The noise canceller 153 may utilize information about the polynomial transform of the interference signal, e.g., based on characterization of the interference signal in the interference path (e.g., the analog preparation unit 140, the 64-FFT unit 154, or the interference effect characterizer module 155).

In some embodiments, for example, multiple down-converters may be used to separate between the received sum and the interference signal. Then, the interference signal may be split, e.g., by noise canceller 153, into multiple frequency components (e.g., possible conjugated components) such that a propagation channel of a single component is substantially flat. The noise canceller 153 may calculate the products of the components, and may select a product which is within the frequency band of the signal-of-interest. In some embodiments, the noise canceller 153 may apply a linear noise cancellation algorithm to the pair of the received sum and the selected product.

In some embodiments, station 101 may estimate a non-linear mutual relation between a characteristic of the incoming interference signal and an estimated effect of the interference signal on the incoming signal-of-interest. For example, station 101 may estimate a non-linear mutual relation between a characteristic of the incoming interference signal and an estimated portion of noise level in the expected received signal caused by the interference signal. In some embodiments, for example, noise canceller 153 may reduce the effect of the incoming interference signal on the signal-of-interest by applying a noise reduction algorithm based on the estimated non-linear mutual relation. In some embodiments, the noise reduction algorithm may further be capable of reducing the effect of the incoming interference signal on the signal-of-interest based on a characteristic of the incoming interference signal. In some embodiments, the noise reduction algorithm may further be capable of reducing the effect of the incoming interference signal on the signal-of-interest based on a sum of the incoming signal-of-interest and a non-linear effect of the incoming interference signal on the incoming signal-of-interest.

In some embodiments, for example, the effect of the interference signal on the signal-of-interest may include, for example, one or more portions of noise level in the incoming signal-of-interest that is caused by the interference signal. In some embodiments, for example, an interferer may utilize multiple frequency components, denoted Ai0, Ai1 and Ai2; and may utilize central frequencies denoted Fi0, Fi1 and Fi2, respectively. The signal-of-interest may overlay a frequency Fs0, which may be substantially equal to a sum of the central frequencies Fi0, Fi1 and Fi2. The interferer may utilize, for example, a non-linear Power Amplifier (PA), such that one or more products of some frequency components may be added to the signal-of-interest (e.g., at the frequency Fs0). For example, a component product may be equal to K*Ai0*Ai1*conjugate Ai2, wherein the factor K may be a demonstrative "effect" of the interference signal that station 101 may estimate and may take into account for noise reduction. In some embodiments, for example, the interference path (e.g., the analog preparation unit 140) may filter one or more frequency components, e.g., components Ai0, Ai1 and Ai2; the components may be multiplied together, and the product may be multiplied by an adaptive factor K. The final product may then be subtracted from the incoming signal-of-interest, e.g., using noise canceller 153.

In some embodiments, the noise reduction algorithm may utilize multiple stages. For example, a first stage may utilize non-split or non-filtered interference components; a second stage may split the interference signal into multiple frequency components, and may attempt to mitigate the residual interference; a third stage may further split the frequency components of the previous stage, and so on. This may be performed, for example, until the frequency selectivity of the noise reduction algorithm reaches a pre-defined threshold, or until other conditions or criteria indicate that the noise reduction is sufficient.

In some embodiments, one or more characteristics of the interference signal may be utilized by noise canceller 153, for example, the characteristics may include one or more frequency components of the interference signal (e.g., which may be filtered or split by analog preparation unit 140), frequency information related to the interference signal, frequency of the interference signal, one or more products created by multiplications of multiple frequency components of the interference signal, one or more products created by multiplication of a conjugate frequency component with other frequency components and optionally by a factor, or other suitable characteristics.

In some embodiments, the effect of the interference signal on the signal-of-interest may include, for example, a noise, a noise component, a "white" noise, a whitening effect, "static" noise, one or more portions of noise level of the signal-of-interest that are caused by the interference signal, one or more portions of noise of the signal-of-interest that may be attributed to the interference signal, spurious noise, intrusions by the interference signal, distortion(s) caused by the interference signals, distortion(s) of the signal-of-interest caused by the interference signal, distortion(s) of the interference signal (e.g., due to filtering and/or amplification in the reception chain), blocking of the signal-of-interest caused by the interference signal, effect of the interference signal on the power level of the received signal-of-interest, phase noise caused by the interference signal, other effect(s) of the interference signal that reduce the Signal to Noise Ratio (SNR) of the received signal-of-interest, signal-of interest disruption(s) caused by the interference signal, modification or alteration of one or more properties of the signal-of-interest caused by the interference signal, or the like. Other types of effects of the interference signal on the signal-of-interest may be estimated, characterized, mitigated and/or canceled in accordance with embodiments of the invention.

Figure 2:
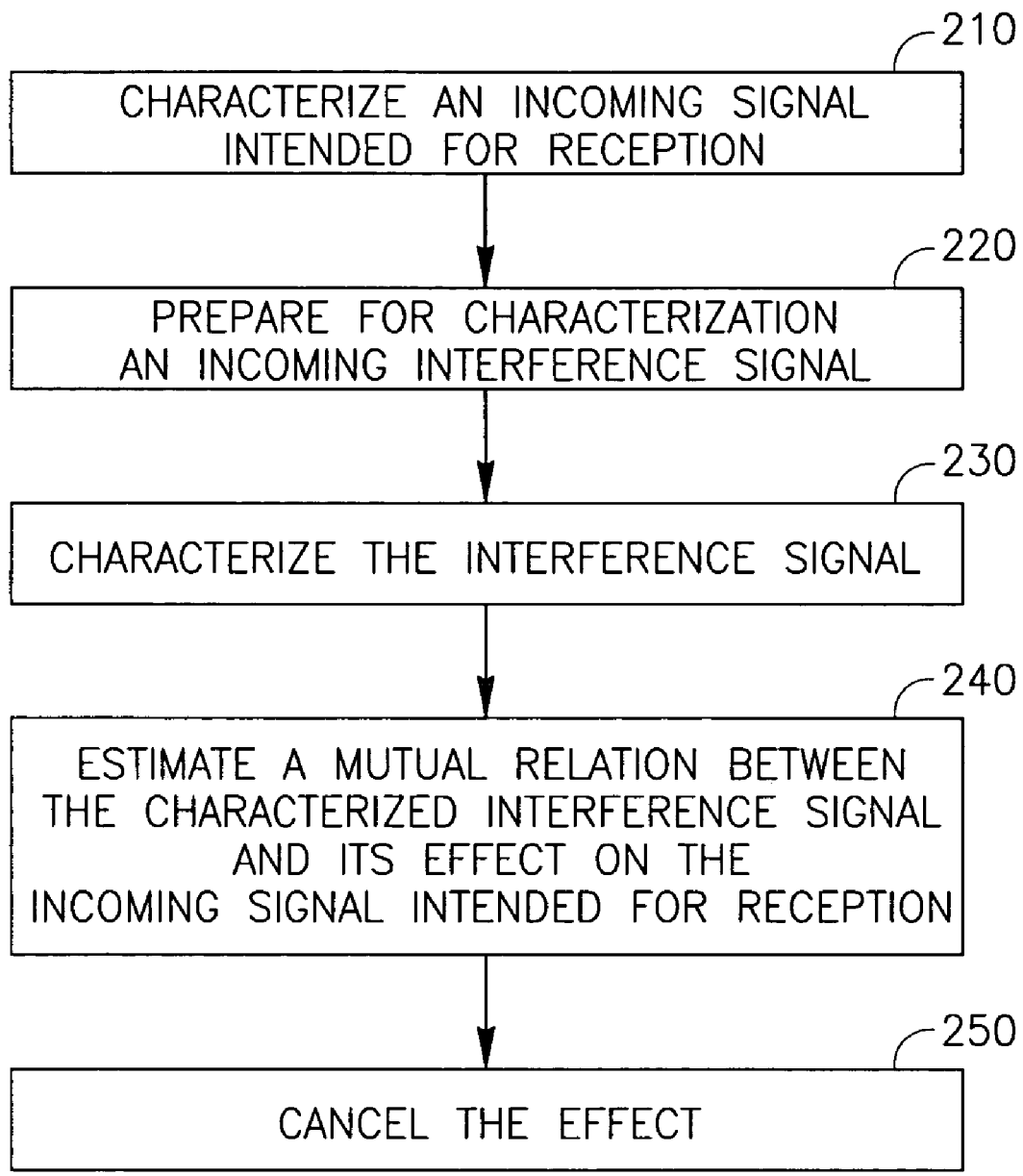
FIG. 2 is a schematic flow-chart of a method of identifying and canceling noise in accordance with a demonstrative embodiment of the invention.

FIG. 2 is a schematic flow-chart of a method of identifying and canceling noise in accordance with an embodiment of the invention. Operations of the method may be implemented, for example, by system 100 of FIG. 1, by station 101 of FIG. 1, by receiver 130 of FIG. 1, and/or by other suitable units, devices, and/or systems.

As indicated at box 210, the method may optionally include, for example, characterizing an incoming signal intended for reception. This may be performed, for example, using a reception chain of a receiver.

As indicated at box 220, the method may optionally include, for example, preparing an incoming interference signal for characterization. This may be performed, for example, using a secondary receiver or an analog filtering unit which may be external to the reception chain of the signal intended for reception, or may be separate from the reception chain of the signal intended for reception.

As indicated at box 230, the method may optionally include, for example, characterizing the incoming interference signal. This may include, for example, converting the incoming interference signal from analog format to digital format, and processing the digital format using one or more linear and/or non-linear algorithms, for example, performing 64-point complex Fast Fourier Transform (64-FFT).

As indicated at box 240, the method may optionally include, for example, estimating a mutual relation between the characterized interference signal and its effect on the incoming signal intended for reception.

As indicated at box 250, the method may optionally include, for example, mitigating, reducing or canceling the effect of the incoming interference signal on the signal intended for reception. This may be performed, for example, based on or taking into account the characteristics of the identified interference signal, the characteristics of the incoming signal intended for reception, and/or the estimated effect of the characterized interference signal on the incoming signal intended for reception.

In some embodiments, the noise canceling may be based on, for example, data related to an interference signal (e.g., one or more characteristics of an interferer signal), for example, as prepared by analog preparation unit 140 and characterized by interference effect characterizer 155; and a data related to a signal intended for reception (or one or more characteristics of the signal intended for reception), optionally including non-linear products or effects of the interference signal, e.g., received from signal characterizer 156.

Other operations or sets of operations may be used in accordance with embodiments of the invention.

Although portions of the discussion herein may relate, for demonstrative purposes, to characterization of an interference signal based on an output of 64-FFT unit, embodiments of the invention are not limited in this regard. For example, characterization of the interference signal may be performed based on, or taking into account, other linear and/or non-linear processing algorithms or mechanisms.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a receiver including:
   a signal reception path to filter and amplify a signal-of-interest from an incoming signal;
   an interference path, connected in parallel to said signal reception path, to identify an incoming interference signal from said incoming signal;
   a digital processing unit operatively connected to said signal reception path and said interference path, said digital processing unit including a characterizer unit and a noise canceller unit, wherein:
   said characterizer unit is to receive from said signal reception path said signal-of-interest and to receive from said interference path the identified interference signal, and based thereupon to estimate a non-linear mutual relation between: one or more characteristics of the incoming interference signal, and an estimated portion of noise level in the incoming signal-of-interest caused by the incoming interference signal; and
   said noise canceller unit is to reduce an effect of the interference signal on the signal-of-interest by applying a noise reduction algorithm based on said non-linear mutual relation.

2. The apparatus of claim 1, wherein said noise reduction algorithm is further capable of reducing the effect of the incoming interference signal on the incoming signal-of-interest based on the one or more characteristics of the incoming interference signal.

3. The apparatus of claim 1, wherein said noise reduction algorithm is further capable of reducing the effect of the incoming interference signal on the incoming signal-of-interest based on a sum of the incoming signal-of-interest and a non-linear effect of the incoming interference signal on the incoming signal intended for reception.

4. The apparatus of claim 1, wherein the characterizer unit is to estimate a mutual relation between: the incoming interference signal, and a sum of the incoming signal-of-interest and a non-linear effect of the incoming interference signal on the incoming signal-of-interest.

5. The apparatus of claim 1, wherein said digital processing unit further comprises:
   a Fast Fourier Transform unit to apply a Fast Fourier Transform algorithm to the incoming interference signal,
   wherein said characterizer unit is to determine one or more characteristics of the incoming interference signal based on an output of said Fast Fourier Transform unit.

6. The apparatus of claim 1, wherein said signal reception path includes:
   a signal reception chain to receive the incoming signal-of-interest, and to filter and amplify the signal-of-interest therefrom.

7. The apparatus of claim 1, wherein said algorithm takes into account at least one characteristic of the incoming interference signal estimated from a digital sample of the incoming interference signal.

8. The apparatus of claim 1, wherein said interference path includes:
   an analog preparation unit to receive said incoming signal and to filter said incoming interference signal therefrom.

9. The apparatus of claim 8, wherein said analog preparation unit comprises:
   a mixer and a synthesizer to tune said analog preparation unit to a frequency at which interference is expected; and
   a low pass filter to filter out frequencies other than said frequency at which interference is expected.

10. A method of receiving a wireless signal at a receiver, said method comprising:
    receiving through a signal reception path an incoming signal-of-interest;

determining through an interference path connected parallel with said signal reception path one or more characteristics of an incoming interference signal;

estimating a non-linear mutual relation between a characteristic of the incoming interference signal and an estimated effect of the incoming interference signal on the incoming signal-of-interest; and reducing the estimated effect of the incoming interference signal on the incoming signal intended for reception by applying a noise reduction algorithm based on the estimated non-linear mutual relation.

11. The method of claim 10, wherein applying comprises:
applying a noise reduction algorithm that is further capable of reducing a characteristic of the incoming interference signal.

12. The method of claim 10, wherein applying comprises:
applying a noise reduction algorithm that is further capable of reducing a sum of the incoming signal-of-interest and a non-linear effect of the incoming interference signal on the incoming signal-of-interest.

13. The method of claim 10, wherein estimating comprises:
estimating a mutual relation between: the incoming interference signal, and a sum of the incoming signal-of-interest and a non-linear effect of the incoming interference signal on the incoming signal-of-interest.

14. The method of claim 10, further comprising:
applying a Fast Fourier Transform algorithm to the incoming interference signal,
wherein estimating the mutual relation comprises determining one or more characteristics of the incoming interference signal based on an output of said Fast Fourier Transform unit.

15. The method of claim 10, wherein applying comprises:
applying a noise reduction algorithm that takes into account at least one characteristic of the incoming interference signal estimated from a digital sample of the incoming interference signal.

16. The method of claim 10, further comprising:
filtering said incoming interference signal from a received wireless communication signal.

17. The method of claim 16, wherein filtering comprises:
tuning an analog preparation unit to a frequency at which interference is expected; and
filtering out frequencies other than said frequency at which interference is expected.

18. A wireless communication system comprising:
a wireless communication device comprising:
a dipole antenna to receive an incoming wireless communication signal;
a signal reception path to filter and amplify a signal-of-interest from said incoming signal;
an interference path, connected in parallel to said signal reception path, to identify an incoming interference signal from said incoming signal;
a digital processing unit operatively connected to said signal reception path and said interference path, said digital processing unit including a characterizer unit and a noise canceller unit, wherein:
said characterizer unit is to receive from said signal reception path said signal-of-interest and to receive from said interference path the identified interference signal, and based thereupon to estimate a non-linear mutual relation between: one or more characteristics of the incoming interference signal, and an estimated portion of noise level in the incoming signal-of-interest caused by the incoming interference signal; and
said noise canceller unit is to reduce an effect of the interference signal on the signal-of-interest by applying a noise reduction algorithm based on said non-linear mutual relation.

19. The wireless communication system of claim 18, wherein said noise reduction algorithm is further capable of reducing a characteristic of the incoming interference signal.

20. The wireless communication system of claim 18, wherein said noise reduction algorithm is further capable of reducing a sum of the incoming signal-of-interest and a non-linear effect of the incoming interference signal on the incoming signal-of-interest.

21. The wireless communication system of claim 18, wherein the characterizer unit is to estimate a mutual relation between: the incoming interference signal, and a sum of the incoming signal-of-interest and a non-linear effect of the incoming interference signal on the incoming signal-of-interest.

* * * * *